United States Patent [19]

Jackson

[11] Patent Number: 5,191,991
[45] Date of Patent: Mar. 9, 1993

[54] HOUSINGS WITH SAFETY PRESSURE RELIEF MEANS THEREON

[75] Inventor: Leonard Jackson, Newcastle Upon Tyne, England

[73] Assignee: Northern Engineering Industries PLC, Newcastle Upon Tyne, England

[21] Appl. No.: 707,290

[22] Filed: May 28, 1991

Related U.S. Application Data

[63] Continuation-in-part of Ser. No. 517,731, May 2, 1990, abandoned.

[30] Foreign Application Priority Data

May 8, 1989 [GB] United Kingdom ............... 8910495

[51] Int. Cl.⁵ .......................................... B65D 51/16
[52] U.S. Cl. ................................... 220/207; 220/89.2; 220/203; 220/208; 220/328; 220/346; 220/366; 220/745; 174/11 R; 411/9; 411/34; 403/2; 403/337; 403/408.1
[58] Field of Search ............... 220/366, 345, 203, 208, 220/327, 328, 89.1, 204, 207, 346, 745, 89.2; 174/11 R; 411/9, 10, 11, 544, 916, 34, 35, 36, 37, 38; 403/2, 337, 408.1

[56] References Cited

U.S. PATENT DOCUMENTS

| | | | |
|---|---|---|---|
| 1,549,665 | 8/1925 | Hill et al. | 220/89.1 |
| 1,729,085 | 9/1929 | Pofeldt | 220/89.1 |
| 2,742,770 | 4/1956 | Graham | 403/337 X |
| 2,918,941 | 12/1959 | Whiting | 138/92 |
| 2,922,544 | 1/1960 | Hibbard et al. | 220/89.2 |
| 2,980,286 | 4/1961 | Coffman | 220/89.2 |
| 3,439,831 | 4/1969 | Pullen | 220/345 |
| 3,704,807 | 12/1972 | Lidgard | 220/89.2 |
| 4,029,233 | 6/1977 | Widenhofer | 220/89.2 |
| 4,453,488 | 6/1984 | Watchorn | 403/337 X |
| 4,692,076 | 9/1987 | Herb | 411/9 X |
| 4,793,509 | 12/1988 | Coleman | 220/207 |
| 4,875,815 | 10/1989 | Phillips, II | 411/38 |
| 4,905,722 | 3/1990 | Rooker et al. | 137/68.1 |
| 4,954,018 | 9/1990 | Gauna | 411/10 X |
| 5,012,945 | 5/1991 | Keenan | 220/207 X |

FOREIGN PATENT DOCUMENTS 0630871 6/1936 Fed. Rep. of Germany ...... 411/544
274713 7/1927 United Kingdom .

Primary Examiner—Allan N. Shoap
Assistant Examiner—Stephen Cronin
Attorney, Agent, or Firm—Cushman, Darby & Cushman

[57] ABSTRACT

A fastening which allows a bolted-on cap to part from a body when excessive pressures develop in a cavity in the body, comprises a nut and bolt arrangement, and includes a weakened tubular spacer surrounding each bolt, between the bolt head and the cap. The wall of the spacer is drilled or scored in its mid-length area. The material and proportions of the spacer, and the proportions of the score or drilling, are so matched in relation to a particular pressure environment, that on excessive pressure developing, the load exerted on the cap causes the spacer to collapse in controlled manner, rather than merely crushing or breaking.

5 Claims, 1 Drawing Sheet

HOUSINGS WITH SAFETY PRESSURE RELIEF MEANS THEREON

This is a continuation-in-part of application Ser. No. 07/517,731, filed on May 2, 1990, which was abandoned upon the filing hereof.

BACKGROUND OF THE INVENTION

1. Field of the Invention

This invention relates to housings provided with safety means thereon to relieve excessive pressure build-up within the housings, and has particular, though not exclusive, application to housings containing high voltage electric circuit re-closers.

2. Description of Related Art

Re-closers for high voltage electricity supply systems commonly comprise automatic and/or manually-operated circuit breakers located within sealed housings containing any one of a number of different fluids such as $SF_6$ gas, oil and the like. Alternatively the housings may be evacuated.

Fault currents and voltages within these housings may be extremely high, typically several thousand amps and volts.

If an abnormal condition should arise whereby the operational capability of the equipment is impaired, inadvertent and undesirable electric arcing may occur within the housing.

The consequential temperature and pressure rises within the housing resulting from this undesirable arcing may be so high that disruptive failure of the housing can occur.

It would therefore be desirable to be able to incorporate pressure relief means on the housing to permit venting thereof once the pressure therein exceeded a predetermined critical value.

Currently available pressure relief devices typically comprise bursting discs. However, certain of these discs suffer from certain disadvantages, such as they have to be mounted in associated holders which, in turn, have to be mounted on the housing to be protected, they require periodic checking to determine the condition thereof, they can be prone to corrosion if located in a hostile environment, they can be prone to leakage and, in order to ensure adequate venting of large vessels containing high pressure fluid, they must be of relatively large area.

SUMMARY OF THE INVENTION

According to the present invention there is provided a housing comprising a body member and a closure member secured together in sealing relationship by a plurality of bolts, the housing being characterised by, for each bolt, deformable means reacting between the bolt and an adjacent one of the body member and the closure member, the arrangement being such that, on increase of pressure within the housing above a predetermined critical value, controlled deformation of the deformable means is effected through relative movement between the body member and the closure member to provide a gap between said members whereby pressure within the housing is relieved.

DETAILED DESCRIPTION OF THE PREFERRED EMBODIMENTS

Figure 1:
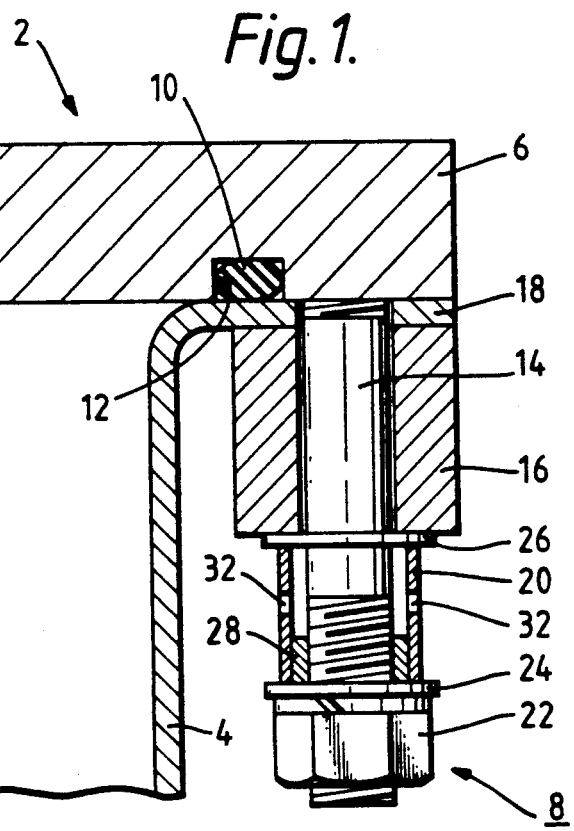
FIG. 1 is a view of a portion of the housing according to an embodiment of the present invention wherein the pressure within the housing has not yet reached the predetermined value.

In one embodiment of the invention, each deformable means comprises a hollow, substantially tubular member surrounding the shaft of the associated bolt and reacting between the head of the bolt and the adjacent one of the body member or the closure member.

Conveniently, location means are provided for each tubular member to locate said member co-axially with the associated bolt, which location means may be provided on the tubular member itself or may comprise a separate component reacting between the bolt and the tubular member.

The tubular member may comprise any suitable material, such as stainless steel or aluminium, and may be provided with a region of weakness therein, such as one or more apertures, for example a pair of diametrically-opposed apertures, or such as scores, grooves or the like, about which initial deformation occurs.

Preferably said region of weakness is located substantially centrally of the tubular member, considered in the axial direction thereof, whereby the central regions of the tubular member are bulged outwardly on deformation.

In an alternative embodiment of the invention, each deformable means comprises a plurality of axially aligned disc springs each of generally truncated conical shape.

By way of example only, an embodiment of the invention will now be described in greater detail with reference to the accompanying drawings which are vertical sections through part of a housing according to the invention showing the deformable means in their undeformed and deformed conditions respectively.

Referring to the drawings, there is shown part of a housing indicated generally at 2 containing an electric re-closer (not shown) typically in a $SF_6$ gas environment.

The housing 2 comprises an open-topped body member or tank 4 and a plate-like closure member or lid 6 secured together in sealing relationship by means of a plurality of circumferentially spaced bolts 8, a sealing ring 10 housed in an annular recess 12 in the underside of the lid 6 ensuring that the interior of the housing 2 is sealed from atmosphere.

More particularly, the threaded shafts 14 of the bolts 8 extend through a support ring 16 reacting against an annular flange 18 of the body member 4, said shafts 14 being received within corresponding threaded recesses in the lid 6.

The illustrated housing incorporates means such that, should pressure within the housing 2 exceed a predetermined maximum value through, for example, undesirable arcing of the circuit breaker within the $SF_6$ gas, pressure within the housing is relieved to prevent distortion and/or explosion thereof.

More particularly, these means comprise, for each bolt 8, a hollow tubular member 20 of, for example, stainless steel or aluminium of known proof stress surrounding the shaft 14 of the bolt 8 and reacting between the head 22 of the bolt and the underside of the support ring 16 through a pair of thrust washers 24,26 respectively. An annular location ring 28 provided on the shaft 14 ensures that the tubular member 20 is positioned co-axially with the bolt 8. A material for the location ring 28 is highly modified ethylene propylene rubber radiation cross-linked polymer, with non-halogen properties. With such a material, upon exposure to high temperature, or flame, the material will not produce noxious fumes. In addition, such material shows good hammer blow absorbing properties. By locating the ring 28 as illustrated in FIG. 1, the coaxial relationship between the bolt 14 and collapsible tube 20 will be assured to thereby result in uniform loading of the collapsible tube 20 which will facilitate a collapse in a controlled and predictable manner.

The arrangement is such that, when the pressure within the housing 2 exceeds a predetermined value due to a transient fault in the electrical equipment within the housing causing arcing thereof, said pressure within the housing 2 tends to force apart the tank 4 and the lid 6 whereby axial compression forces are applied to the tubular members through attempted relative movement between the tank 4 together with the support ring 16 and the lid 6 together with the bolts.

Figure 2:
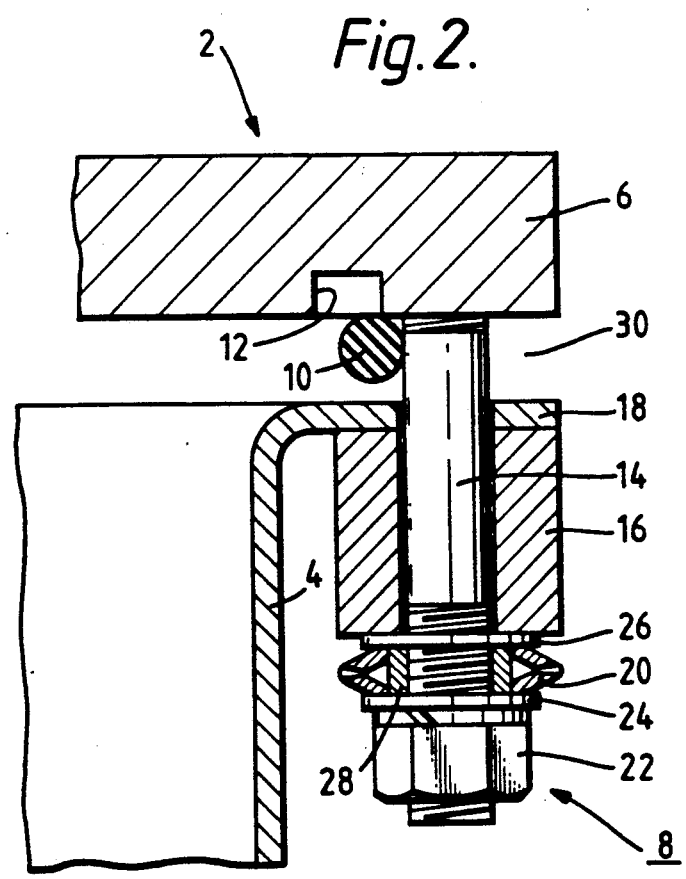
FIG. 2 is a view of a portion of the housing according to an embodiment of the present invention wherein the pressure within the housing has reached the predetermined critical value and thus the deformable means has been deformed.

When the axial forces applied to the tubular members 20 exceed the proof stress of the material of the members 20, deformation of the tubular members 20 occurs as shown in FIG. 2 whereby a gap is formed between the tank 4 and the lid 6 to permit relief of the pressure within the housing 2.

Clearly, the material and dimensions of the tubular members 20 and the torque applied to the bolts 8 are chosen such that deformation of the tubular members 20 occurs at a predetermined pressure within the housing 2. It is preferred to incorporate a region of weakness centrally within the tubular members 20, for example a pair of diametrically opposed holes 32, whereby initial deformation of the members occurs in said central regions which are bulged outwardly as shown in FIG. 2 into substantially Chinese-lantern shape.

For a given tubular member 20, the pressure at which deformation occurs can be varied by varying the nature and/or location of this region of weakness, which may be formed by scores, grooves, perforations or the like in the member 20.

Alternatively the pressure at which deformation occurs can be varied by varying the size and material of the tubular members 20. For example, stainless steel has a higher tensile strength than aluminium and, for higher pressure situations, stainless steel may be more suitable in that it will collapse or deform more like a spring than aluminium and will avoid excessive forces on the bolts 8 by absorbing extra energy compared with aluminium.

The provision of deformable tubular members 20 gives to the user a clear visual indication that a fault has occurred and that repair is required.

The deformable means may be other than tubular members such as shown in the drawings, and may comprise, for example, a bank of disc springs each of generally truncated conical shape, individual springs of a bank either being nested to provide a relatively compact, resilient arrangement, or alternate springs being inverted relative to the adjacent springs to provide a more extensive resilient arrangement but with the same loading characteristics as a nested arrangement with the same number of springs.

Although described in connection with high voltage electric re-closers, the invention has application to any housings the interiors of which are likely to be subjected to undesirably high pressures.

I claim:

1. A housing comprising a body member and a closure member secured together in a sealing relationship by a plurality of bolts, each of said bolts having a shaft and a head, a tubular deformable member being provided for each of said bolts to surround the shaft of said each bolt to react between the head of said each bolt in and an abutting one of the body member and the closure member, each of said tubular deformable members being provided with a spacing means for spacing the deformable member coaxially with respect to said each bolt, said spacing means comprising a ring encircling said tubular member and having a thickness so as to assure co-axial positioning of said tubular member about said shaft of said associated bolt to thereby assure uniform loading of said deformable member thereby hindering premature collapsing of said tubular deformable member, whereby upon an increase in pressure within the housing above a predetermined critical value, controlled deformation of the tubular deformable member is effected through relative movement between the body member and the closure member to provide a gap between said members to relieve pressure within the housing.

2. A housing as claimed in claim 1 in which each tubular deformable member is provided with a region of weakness therein about which initial deformation occurs, said region of weakness being indicative of said predetermined critical value at which deformation occurs.

3. A housing as claimed in claim 2 in which the region of weakness is defined by one or more apertures located substantially centrally of the tubular deformable member when the tubular deformable member is viewed in its axial direction.

4. A housing as claimed in claim 2, wherein said predetermined critical value is effected through control of a diameter of said deformable members, material said deformable members are formed of and said region of weakness.

5. A housing comprising a body member and a closure member secured together in a sealing relationship by a plurality of bolts, each of said bolts having a shaft and a head, a tubular deformable member being provided for each of said bolts to surround the shaft of said each bolt to react between the head of said each bolt in and an abutting one of the body member and the closure member, each of said tubular deformable members being provided with a spacing means for spacing the deformable member co-axially with respect to said each bolt so as to assure uniform loading of said deformable member thereby hindering premature collapsing of said deformable member, whereby upon an increase in pressure within the housing above a predetermined critical value, controlled deformation of the tubular deformable member is effected through relative movement between the body member and the closure member to provide a gap between said members to relieve pressure within the housing, said spacing means being made of ethylene propylene rubber radiation cross-linked polymer with non-halogen properties.

* * * * *